United States Patent [19]

Medicus et al.

[11] 4,450,076

[45] May 22, 1984

[54] SMALL-SAMPLE DIALYZER

[76] Inventors: Gustav K. Medicus; Rudolf G. Medicus, both of 7521 W. Hyland Dr., Dayton, Ohio 45424

[21] Appl. No.: 409,881

[22] Filed: Aug. 20, 1982

[51] Int. Cl.³ .................................... B01D 31/00
[52] U.S. Cl. ....................... 210/242.1; 210/321.2; 210/323.1
[58] Field of Search ............... 210/321.2, 323.1, 406, 210/242.1, 321.3

[56] References Cited

U.S. PATENT DOCUMENTS

| | | | |
|---|---|---|---|
| 444,500 | 1/1891 | Meyer | 210/242.1 X |
| 2,692,854 | 10/1954 | Henley | 210/321.2 X |
| 3,319,792 | 5/1967 | Leder et al. | 210/323.1 X |

OTHER PUBLICATIONS

Frey, College Chemistry, 1961, pp. 548 & 549.

*Primary Examiner*—Frank A. Spear, Jr.
*Attorney, Agent, or Firm*—Louis E. Hay

[57] ABSTRACT

A small-sample dialyzer having dialysis cells comprising a plastic tube covered on one end with a dialysis membrane, the dialysis cells being mounted in a cell holder positioned to place the membrane on the cells in contact with the liquid in the container into which an ingredient in the sample is to dialyze. The dialysis process may take place without external agitation, with agitation by magnetic means, or, agitation by means of a linear shaker apparatus.

1 Claim, 16 Drawing Figures

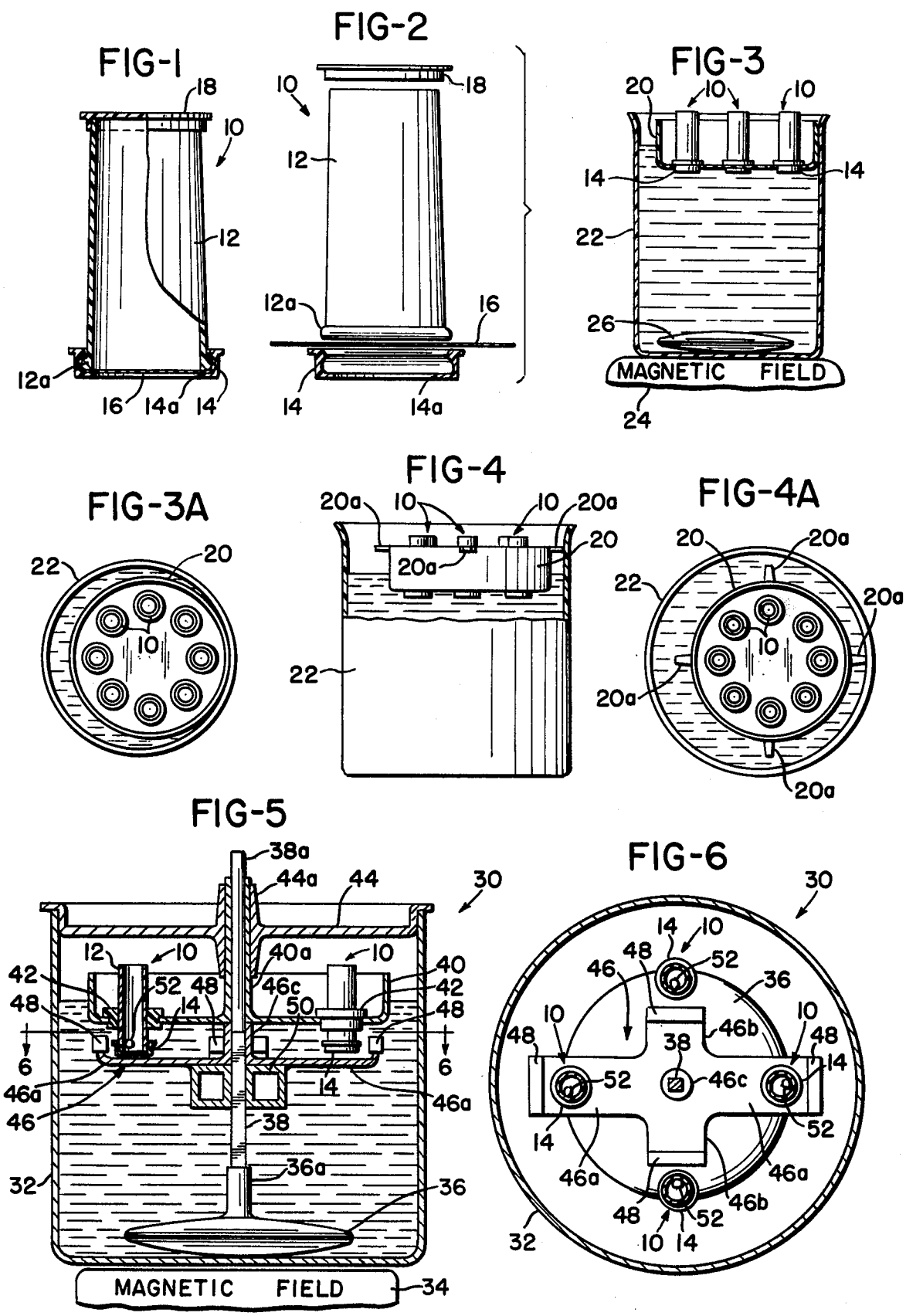

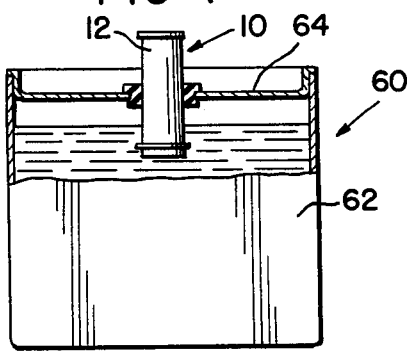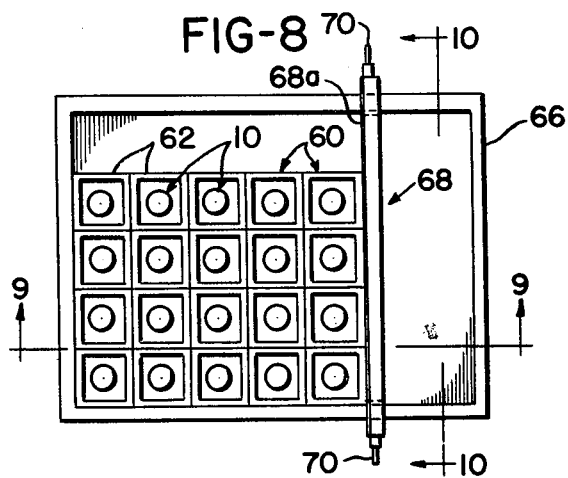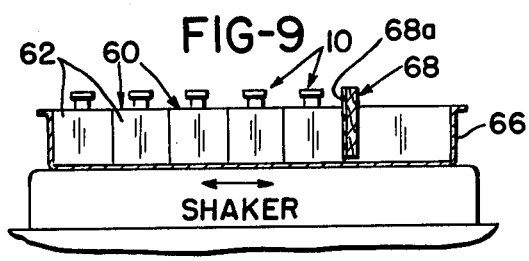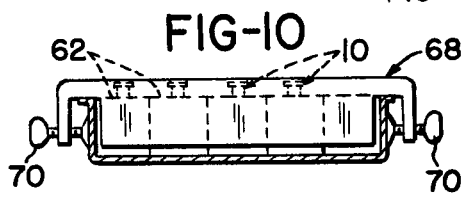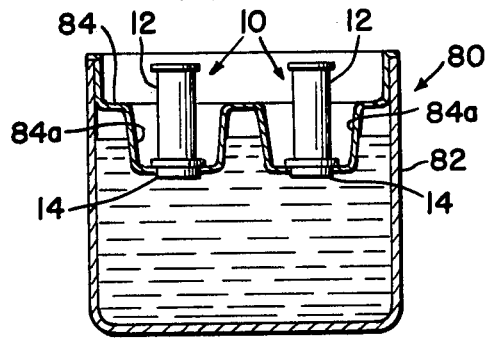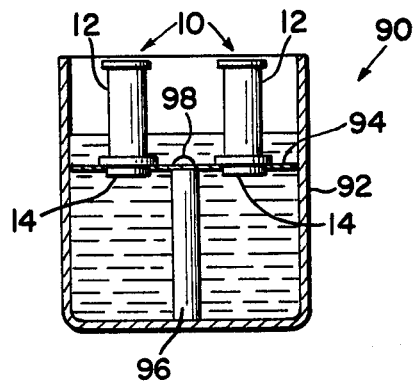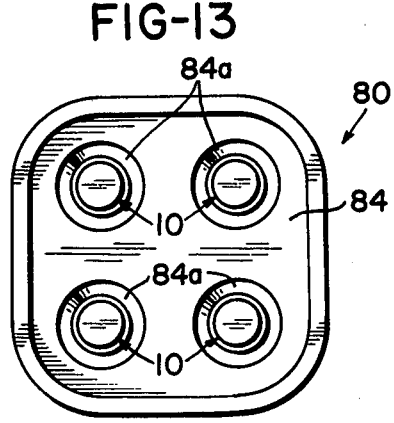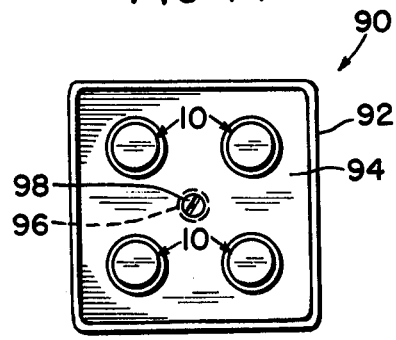

SMALL-SAMPLE DIALYZER

REFERENCE TO RELATED U.S. PATENTS

Pat. No. 2,985,587 Method of and Apparatus for Dialysis - Hoch et al. U.S. Pat. No. 3,811,573 Dialysis Apparatus - Weder. U.S. Pat. No. 4,145,293 Precise Cutoff Concentrator-Dialyzer Device - Cook.

BACKGROUND OF THE INVENTION

This invention relates to dialyzers, the purpose of which is well known in medical and research organizations. One common use for a dialyzer is to reduce, for example, the salt concentration of a carrier liquid in a sample to be dialyzed without a substantial increase in the volume of the carrier liquid. The salt concentration could be reduced by dilution; however, this would proportionately increase the volume of the carrier liquid.

For example, a sample to be dialyzed contains a protein in a high saline solution, and it is desired to reduce the concentration of the salt in the saline solution. The sample is placed in a small container which is semi-permeable. The sample container is then placed in a much larger vessel which contains a liquid of very low salt concentration.

The dialyzer is configured in a manner such that when the sample container is placed in the dialyzer, the semi-permeable container separates the liquid in the sample container from the larger volume of liquid with which the sample is to dialyze. The material from which the sample container is made must be of such porosity as will permit diffusion or passage of the salts through the container, while at the same time barring passage of the protein.

The greater the ratio between the two volumes of the liquids, the greater will be the reduction of the salt concentration in the sample. For example, if the volume of the liquid in the dialyzer is 1000 times greater than the volume of the liquid in the sample, nearly all the salt can be removed from the sample to make the sample nearly salt-free.

The dialysis process is greatly accelerated by agitating or stirring both liquids. With past dialyzers it has not been too difficult to provide mechanisms for stirring the large volume of liquid in the dialyzer; however, there has remained the problem of simultaneously agitating the sample in a manner such that there is relative motion of the liquids on opposing sides of the sample container.

The conventional method for dialyzing small samples in a laboratory has been to place the sample into a commercially available dialysis tubing which is semi-permeable material. The lower end of the tube is closed by tying a knot in the tubing, and after the smple has been placed in the tubing, the upper end of the tubing is closed with a second knot.

The small tubes containing the samples are then immersed in the surrounding liquid in the large container of the dialyzer where they are preferably tied to the container by strings in order that they are not swept along with the water current as the water is stirred to wash away the salt diffusing from the samples in the tubes. Obviously, the mixing of the samples inside the tubes is far less than that of the liquid outside of the tubes, although the agitation of the samples in the tubes is of comparable importance. One of the chief disadvantages of the conventional method is the time consumed in preparing for the dialysis operation. Time saving arrangements thus far have been developed only for large volume single-sample dialysis as used in manufacturing operations.

As will be depicted and described below, the applicants have invented an apparatus and method for the dialysis of either a single small sample, or the dialysis of multiple small samples, which is far more expeditious and cost efficient than all prior known methods.

SUMMARY OF THE INVENTION

The present invention uses a novel type of dialysis cell which is preferably made of a length of rigid transparent plastic tubing which is open at the upper end and is closed at the lower end by a semi-permeable dialysis membrane. The membrane is held in position by a retainer or snap ring. There are several advantages for the new cell. It is very easy to control the ratio of exposed membrane area to the volume of the sample by filling the cells to different levels. Another advantage is that the cells may be pre-assembled by the manufacturer and ready for laboratory use. Another advantage is in sample identification because each cell may be inscribed with an identification number or by other marking. Still another advantage is that the cells may be mounted and adjusted in the dialyzer container before the samples to be dialyzed are placed in the cells. The new dialyzers also provide several novel methods for agitating the samples.

The dialyzers constituting the present invention also permit the simultaneous dialysis of a plurality of samples in a single dialyzer, and the samples need not be placed into or removed from the dialyzer at the same time.

BRIEF DESCRIPTION OF THE DRAWINGS

FIG. 1 is an elevation, partially in section, and showing a dialysis cell with a membrane in assembled position;

FIG. 2 is an elevation, comparable to FIG. 1, and showing the elements of the dialysis cell in disassembled relationship;

FIG. 3 is a vertical cross-section showing three of the FIG. 1 dialysis cells attached to a cell holding tray floating on a liquid in a beaker;

FIG. 3A is a top plan view of FIG. 3 showing 8 dialysis cells in a floating cell holder;

FIG. 4 is an elevation, partially in section, and showing a variation of the cell holder depicted in FIG. 3;

FIG. 4A is a top plan view of FIG. 4 and showing protrusions extending from the rim of the cell holder;

FIG. 5 is a vertical cross-section of one species of the dialyzer in which a plurality of permanent magnets are used to agitate the samples in the cells;

FIG. 6 is a horizontal section taken on line 6—6 of FIG. 5;

FIG. 7 is an elevation, partially in section, and showing a single dialysis cell located in the lid of a container;

FIG. 8 is a plan view of a plurality of the units depicted in FIG. 7 arranged in a tray to be placed on a linear shaker;

FIG. 9 is a vertical section taken on line 9—9 of FIG. 8;

FIG. 10 is a vertical section taken on line 10—10 of FIG. 8;

FIG. 11 is a vertical cross-section showing an alternate lid configuration;

FIG. 12 is a vertical cross-section showing a plurality of dialysis cells in a cell holder which is submerged in a liquid;

FIG. 13 is a top plan view of FIG. 11; and,
FIG. 14 is a top plan view of FIG. 12.

DESCRIPTION OF THE PREFERRED EMBODIMENT

FIGS. 1 and 2 depict the elements comprising the dialyzer cell 10. The cell consists of a convenient length of a rigid plastic tube forming a cell body 12, the lower end of which has an external rim portion 12a of any convenient cross-section. The container or cell body is preferably formed of a transparent material which has narrow circumferential tolerance to form a good sealing surface with seal rings which will be described below.

The dialyzer cell 10 is provided with a retaining or snap ring 14 which is internally configured to be comparable with the rim portion 12a when snapped in place. The snap ring is provided with a relatively large aperture 14a. The snap ring is preferably made of a material having a degree of resilience, such as rubber or polyethylene.

The cell body 12 may also be made without the rim portion 12a, in which case the lower end would have the wall rounded in order to eliminate sharp edges which could damage the membrane. The retainer ring would be sized to have an interference fit which will hold the membrane in place.

The dialyzer cell 10 is provided with a membrane 16. The membrane is made of a commercially available dialysis membrane material which is semi-permeable. A proper choice of permeability is required, since the membrane must be permeable to certain materials, and non-permeable to certain other substances in the sample which are not to pass through the membrane.

The membrane may be cut into oversize square or disc blanks. One of the blank membranes is placed on the open end of the snap ring as depicted in FIG. 2, after which the cell body is pushed downward until the ring snaps in place and holds the membrane taut as depicted in FIG. 1. There is less danger of damaging a membrane if it is wet when installing into the cell. After the membrane is installed, the surplus material may be trimmed to present a smooth edge as depicted in FIG. 1. If desired, each dialyzer cell may be provided with a closure cap 18 as depicted in FIGS. 1 and 2. Closure caps are not necessary for proper functioning of the dialyzer cells, and their use is optional.

The dialysis cells 10 may be used in various species of the present invention. FIGS. 3 and 3A depict a simple dialyzer which may be used. A plurality of cells (8 in FIG. 3A) are placed in a floating cell holder 20 which will float on the liquid contained in a beaker 22. The snap rings 14 on the cells form an interference fit in the apertures through the cell holder 20.

The dialysis process will proceed with the above-described arrangement; however, the process will be accelerated if the liquid in the beaker is stirred. The liquid in the beaker is stirred or agitated by a conventional magnetic stirring apparatus consisting of a rotating magnetic field 24 on which the beaker is placed, and a bar magnet 26 at the bottom of the beaker. The magnet revolves in the magnetic field and agitates the liquid. The arrangement depicted in FIGS. 3 and 3A will produce a minimum amount of agitation of the liquid in the samples.

Although FIGS. 3 and 3A depict a dialyzer using a plurality of cells 10, more or less cells may be used by changing the number of apertures in the cell holder 20. A cell or a plug must be in place in each aperture in the cell holder to prevent liquid from entering an open aperture and thereby cause the cell holder and cells to submerge in the liquid contained in the beaker. The minimum number would be to have a single aperture in the cell holder to accomodate a single cell. The maximum number would depend on the size of the individual cells and on the size of the beaker. If a magnetic stirring apparatus is to be used, then the beaker must be made of a non-magnetic material, otherwise it may be made of any suitable material which will hold a liquid.

FIGS. 4 and 4A depict a modification of the species depicted in FIGS. 3 and 3A. The modification consists of a plurality of protrusions 20a extending horizontally from the cell holder 20. The preferred location of the protrusions is from the brim of the cell holder as depicted in FIG. 4. It has been found that there will be more agitation of the samples when the cell holder has the protrusions than when the protrusions are omitted. Without the protrusions, and when the liquid in the beaker is stirred, the cell holder will contact the beaker as depicted in FIG. 3A and will separate therefrom with a relatively slow gliding motion which does not produce a violent an agitation in the samples as when the protrusions are used. When one of the protrusions contacts the inside wall of the beaker as depicted in FIG. 4A, the contacting protrusion acts as a fulcrum about which the cell holder pivots and breaks contact with the beaker at a faster rate which produces additional agitation in the sample.

Either construction of the cell holder will permit dialysis. The advantage of the protrusions is that the additional agitation produced in the samples will reduce the elapsed time for complete dialysis.

Another species of the present invention is depicted in FIGS. 5 and 6. This species uses a magnetic stirring apparatus, of the type previously described, for agitating the liquid in a large beaker or other suitable vessel, and in addition has a plurality of permanent magnets for supplementing the agitation of the liquid in the dialysis cells 10.

The dialyzer 30 has a large container such as a large beaker 32 which is placed on a rotating magnetic field 34. A magnet 36 is at the bottom of the beaker where it is rotated by the magnetic field. The magnet is sheathed in plastic which has an upward extending hub or boss 36a which has a square socket for receiving the lower end of a square drive shaft 38 which rotates with the magnet. The upper portion 38a of the drive shaft has a circular diameter not to exceed the dimension between two opposing sides of the square portion of the drive shaft 38.

A plurality of dialysis cells (4 in FIG. 6) are mounted in a floating cell holder 40. Whereas in the floating cell holders depicted in FIGS. 3 and 4, the cells were held in place by snap rings 14, in the present case the cells are held in place by suitable seal rings 42 which pass partially through apertures in the cell holder. In the species depicted in FIG. 5, the lower end of the dialysis cells 10 are extended into the liquid in the beaker beyond the bottom of the cell holder for reasons which will become apparent below.

As depicted in FIG. 5, the cell holder has a relatively long upward extending hub 40a which has a longitudinal aperture therethrough for receiving the upper round portion 38a of the drive shaft 38. The drive shaft is free to turn without rotating the cell holder 40.

The outer diameter of hub 40a is free to rotate in a longitudinal aperture extending through hubs 44a in guide member 44. The guide member 44 may be in the form of a cover as depicted, or, it may be in spider form. The purpose of the guide member is to position and guide the free end of the drive shaft 38.

An agitator 46, in the form of a cross, as depicted in FIG. 6, is positioned to be below the cell holder 40 where it is to be rotated by the magnet 36 acting through the drive shaft 38.

As best seen in FIG. 6, the agitator has two long arms 46a, and two short arms 46b. The arms are turned upward as seen in FIG. 5. The upturned end of each arm supports a permanent magnet 48. As seen in FIGS. 5 and 6, the long arms 46a are of such length that the magnets 48 will revolve in a circular path outside the dialysis cells 10, and the short arms 46b are of such length that the magnets which they support revolve in a circular path inside the dialysis cells.

The agitator has an upward extending hub 46c having a longitudinal aperture of square cross-section for receiving the lower square portion of the drive shaft 38. The hub 46c is of such length that when the free end of the hub abuts against the bottom of the cell holder 40, a vertical relationship is established which will prevent the magnets 48 from rubbing against the bottom of the cell holder 40, while at the same time providing ample space for the lower end of the cells 10. The relative position of the various elements is depicted in FIG. 5.

Since the agitator, with attached magnets 48, has a specific gravity which is greater that the liquid in which it is submerged, a counteracting force must be applied to keep the agitator from sinking in the liquid. One method is to use a hollow air tight vessel or ballast 50 which has a specific gravity which is less than the liquid in which it is submerged, and which therefore will provide the necessary buoyancy for maintaining the agitator in its required position. The ballast may take any suitable form, and may or may not be attached to the agitator. The ballast may take the form of a hollow vessel, or, it may be made of a material such as cork.

The magnets 48 act on small ferromagnetic balls 52 which are preferably coated with a plastic material such as polyacrylate or teflon. One ball is placed in each of the cells 10. The magnets on the agitator move the balls from one side of the cell to the other, and this motion agitates the liquid in the cell. As clearly shown in FIG. 6, the magnets on the long agitator arms attract the balls toward the outside of the cells, and the magnets on the short arms attract the balls toward the inside of the cells. There are four reversals of movement for each revolution of the agitator.

The various species of the dialyzer depicted in FIGS. 3–6 may all use electromagnetic stirring devices. The remaining species to be described are for use on shaking or vibration producing devices which are also common laboratory equipment. The dialysis cells 10 are the same in all cases.

FIG. 7 depicts a dialyzer having a means for supporting a single dialysis cell 10. The dialyzer 60 has a container 62 which is preferably of rectangular or square cross-section in order that a plurality of the dialyzers may be arrayed and held in place on a common loading tray as depicted in FIGS. 8–10. The supporting means, for holding the cells 10 in position, may be a simple cover 64 as depicted in FIG. 7, or, it may take a more elaborate form as depicted in FIG. 11. The cell 10 passes through an aperture in the cover 64 where it is held in position by the same seal ring 42 which was used in the dialyzer depicted in FIG. 5. Because some shaking devices produce substantial vibration, it is preferable that closure caps 18 be used on the cells 10.

FIG. 8 depicts a plurality of dialyzers 60 arrayed on a loading tray 66 where they are held in place by means of a movable gate 68 which may be held in place on the loading tray by means of thumb screws 70. The face of the gate adjacent to the dialyzers should be faced with an elastic material 68a such as sponge rubber, as seen in cross-section in FIG. 9. The gate should be attached in the direction which will prevent separation of the individual dialyzer units by the to-and-fro linear movement of the shaking apparatus.

One advantage of individual dialyzers 60 is that the salt diffusing out of one sample is confined to the liqud in that particular dialyzer, whereas in the previously described dialyzers, different salts from different cells will diffuse into the various cells. This feature is of particular advantage to clinical laboratories which work with various toxic materials.

FIG. 11 is a vertical cross-section through a dialyzer assembly having the general overall configuration of the unit depicted in FIG. 7. The dialyzer 80 has a container 82 which is large enough to accomodate a plurality of dialysis cells 10. The cover 84 contains a plurality of wells 84a (4 in FIG. 13), each of which has an aperture for receiving a dialysis cell as depicted in FIG. 1, with the retaining ring 14 forming the seal. This type of cover construction may also be used for a single cell dialyzer as depicted in FIG. 7.

In like manner, the cover construction depicted in FIG. 7 may be used in a dialyzer for using a plurality of cells 10. The container 62 and cover 64 would be made larger, and the cover would have a plurality of apertures for receiving and mounting the cells 10.

FIG. 12 is a vertical cross-section of a variation of the dialyzer construction depicted in FIGS. 7 and 11. The dialyzer 90 has a container 92 which is large enough to accomodate a plurality of dialysis cells 10. The cover 94, which supports the cells, may be either flat as the cover 64 in FIG. 7, or, it may have wells, as cover 84 in FIG. 11. The cover 94 slides into the container where it is supported by a supporting member 96 which may be attached to the cover by means of a screw 98.

It is to be understood that the embodiments of the present invention as shown and described are to be regarded merely as illustrative, and that the invention is susceptible to variations, modifications and changes, without regard to specific construction methods, within the scope of the appended claims.

We claim:
1. A small-sample dialyzer comprising:
(a) a plurality of dialysis cells for holding fluid samples, each comprising: a circular elongated tube open at both ends, a dialysis membrane covering one open end of said tube, and a retaining ring for holding said membrane in position on said tube;
(b) a plurality of magnetic balls for placing within said dialysis cells;
(c) a substantially flat bottomed open top container of non-magnetic material for holding a liquid into which an ingredient in said fluid samples is to dialyze;
(d) a plurality of seal rings longitudinally adjustable and surrounding the tube on each of said dialysis cells;
(e) a circular dished cell holding tray for floating on the liquid in said container and having a coaxial elongated upward extending circular hub contain- ing a coaxial circular bore through said holding tray, and further having a plurality of apertures in the bottom of said circular holding tray coaxially spaced about the circular bore through said holding tray, said apertures receiving in firm resilient engagement said seal rings on each of said dialysis cells and vertically positioning said dialysis cells containing said magnetic balls with the membrane on said dialysis cells in contact with the liquid in said container;

(f) an agitator having two opposing long arms horizontally extending from a central hub and extending beyond the outer extremity of said dialysis cells mounted in said holding tray, and two opposing short arms horizontally extending from said central hub at substantially right angles to said long arms and of a length short of the inner extremity of said dialysis cells mounted in said holding tray, each of said arms supporting a permanent magnet at the outer extremity of said arms, said central hub extending upward from said arms and abutting against the lower side of said holding tray for establishing a predetermined vertical distance between said holding tray and said agitator arms within which vertical distance the lower ends of said dialysis cells are to be positioned, said central hub further having a vertical square aperture therethrough;

(g) a driving permanent magnet sheathed in plastic having an upward extending hub with a vertical socket therein of square cross-section, said magnet being in the bottom of said container for rotation by an external rotating magnetic field;

(h) an elongated drive shaft having a lower end of square cross-section for engaging the socket in said driving magnet and extending upward through the square aperture in the hub of said agitator for rotating said agitator with the magnets on the arms of said agitator moving said magnetic balls to-and-fro in said dialysis cells, said drive shaft further having a circular upper end rotationally extending through the circular bore in said cell holding tray; and, (i) a guide member supported by the open end of said container, said guide member having a vertically extending hub having a longitudinal bore therethrough for rotationally receiving the hub on said holding tray.

* * * * *